(12) United States Patent
Chen et al.

(10) Patent No.: US 9,740,057 B2
(45) Date of Patent: Aug. 22, 2017

(54) THIN FILM TRANSISTOR-LIQUID CRYSTAL DISPLAY DEVICE AND ITS DRIVING METHOD

(75) Inventors: Ming Chen, Beijing (CN); Dan Wang, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 1583 days.

(21) Appl. No.: 12/574,836

(22) Filed: Oct. 7, 2009

(65) Prior Publication Data
US 2010/0091210 A1    Apr. 15, 2010

(30) Foreign Application Priority Data
Oct. 10, 2008    (CN) .......................... 2008 1 0223760

(51) Int. Cl.
*G09G 3/36*    (2006.01)
*G02F 1/1343*    (2006.01)

(52) U.S. Cl.
CPC ..... *G02F 1/134336* (2013.01); *G09G 3/3655* (2013.01); *G02F 2001/134318* (2013.01); *G09G 3/3614* (2013.01); *G09G 2300/0426* (2013.01); *G09G 2330/021* (2013.01)

(58) Field of Classification Search
CPC ......... G09G 3/3614; G09G 2300/0426; G09G 2330/021

USPC .............................................. 345/92, 87, 55
See application file for complete search history.

(56) References Cited

U.S. PATENT DOCUMENTS

| | | | |
|---|---|---|---|
| 7,355,575 B1 * | 4/2008 | Ota et al. ........................ | 345/87 |
| 2006/0238687 A1 * | 10/2006 | Su .................................. | 349/129 |
| 2009/0262061 A1 | 10/2009 | Chung et al. | |

FOREIGN PATENT DOCUMENTS

| | | | | |
|---|---|---|---|---|
| CN | 101261414 A | | 9/2008 | |
| JP | 2002-258243 | * | 9/2002 | ............... G09G 3/36 |

* cited by examiner

*Primary Examiner* — William Boddie
*Assistant Examiner* — Leonid Shapiro
(74) *Attorney, Agent, or Firm* — Ladas & Parry LLP (57) ABSTRACT

The invention discloses a TFT-LCD and its driving method, TFT-LCD comprises an array substrate and a color filter substrate, a common electrode on said color filter substrate being divided into multiple columns, each of which corresponding to one column of pixels; on color filter substrate, odd number columns are first common electrodes, even number columns are second common electrodes; difference between voltages input to said first common electrodes and said second common electrodes is larger than zero and less than dynamic range of driving voltage of liquid crystal driving voltage-transmittance curve. By setting two common electrode voltages, TFT-LCD and its driving method provided by the invention can make dynamic range of input voltage required for driving liquid crystal display device be smaller than dynamic range of driving voltage of liquid crystal driving voltage-transmittance curve, thus reducing power consumption during driving the liquid crystal.

3 Claims, 6 Drawing Sheets

THIN FILM TRANSISTOR-LIQUID CRYSTAL DISPLAY DEVICE AND ITS DRIVING METHOD

TECHNICAL FIELD OF THE INVENTION

The present invention relates to the field of liquid crystal display, and to a TFT (Thin Film Transistor) Liquid Crystal Display device and its driving method.

BACKGROUND OF THE INVENTION

Liquid crystals in a TFT-LCD (Liquid Crystal Display) are sandwiched by an array substrate on which there are a TFT and a pixel electrode, and a color filter substrate on which there are a color resin and a common electrode, wherein the liquid crystals inverse when a voltage is applied between the common electrode and the pixel electrode. For a LCD of normally white mode, the less the voltage difference between two sides of liquid crystals is, the larger the transmittance of the liquid crystal molecules are. When a voltage is applied between two sides of the liquid crystal molecules, the liquid crystal molecules rotate, thus making a light provided by a backlight transmitting out through the liquid crystal molecule, wherein the amount of the light transmitted out is determined by rotation angle of the liquid crystal molecules. Due to the property of the liquid crystal molecules itself, if driving with a voltage of only one polarity, the liquid crystal molecules is extremely vulnerable to aging, thus shortening the lifetime of the liquid crystal molecule. Therefore, in order to prevent it from aging, it is necessary to drive the liquid crystal molecules in such a way that voltages of positive polarity and negative polarity are alternately used for driving.

Figure 1:
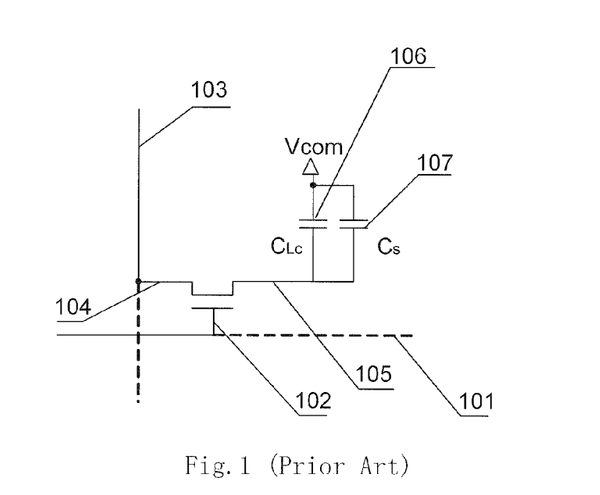
FIG. 1 is a structural schematic diagram of TFT in the prior art.

A structural schematic diagram of a TFT in the prior art is as shown in FIG. 1, wherein when the gate line 101 apply a turn-on voltage to the gate 102, the TFT is in an ON state. Data line 103 is connected to the source 104 of the TFT, while the drain 105 of the TFT is connected to the pixel electrode (not shown in FIG. 1). The voltage difference between the pixel electrode and the common electrode set on the color filter substrate drives the liquid crystal molecules to inverse. The common electrode is applied a common electrode voltage Vcom. In FIG. 1, pixel capacitor ($C_{Lc}$) 106 is an equivalent capacitor formed between the common electrode and the pixel electrode. When the TFT is turned on, the pixel capacitor ($C_{Lc}$) 106 is charged through the data line 103. Holding capacitor ($C_s$) 107 is usually connected in parallel with the pixel capacitor ($C_{Lc}$) 106 to improve its holding property.

After the pixel capacitor ($C_{Lc}$) 106 has been charged, a turn-off voltage is supplied to the gate 102 of the TFT through the gate line 101, the TFT being in an OFF state at this time, and the voltage already charged to the pixel capacitor ($C_{Lc}$) 106 can be maintained until next time the gate is turned on.

Figure 2:
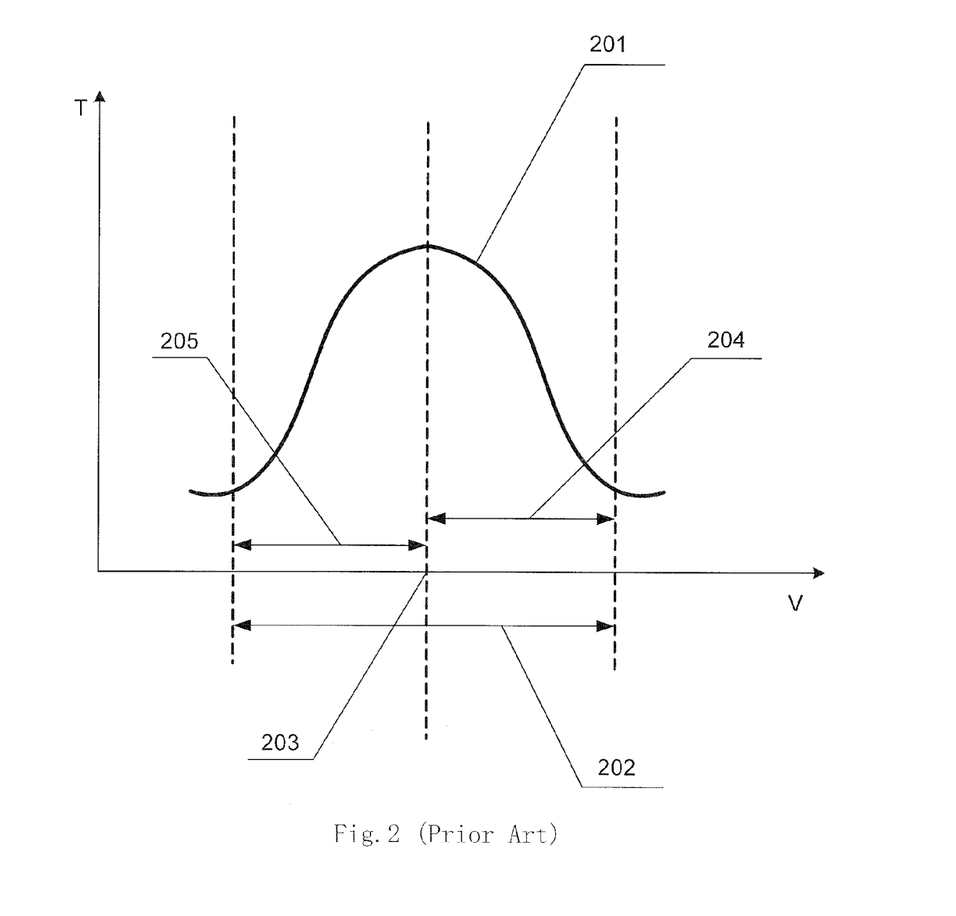
FIG. 2 is a schematic diagram of driving for liquid crystal molecules in the prior art.

A schematic diagram of driving for liquid crystal molecules in the prior art is as shown in FIG. 2. In the Figure, the lateral axis of measured V-T curve 201 for liquid crystal stands for Driving Voltage (V), and the longitudinal axis of the V-T curve stands for Transmittance (T) of the liquid crystal molecules, the V-T curve being determined by the property of the liquid crystal itself. After the V-T curve for liquid crystal is measured, it is needed to determine the dynamic range 202 of driving voltage, and to determine the common electrode voltage 203 based on the dynamic range 202. With respect to the LCD of normally white mode, the lower the voltage difference between the two sides of the liquid crystal is, the larger the transmittance of the liquid crystal molecules is. Thus, the common electrode voltage 203 is chosen as corresponding driving voltage when the transmittance of the liquid crystal is highest, that is, the common electrode voltage 203 may be corresponding abscissa at the maximum of the V-T curve 201. Within the dynamic range 202, the range of the driving voltage higher than the common electrode voltage is defined as positive directional driving voltage range 204, and the range of the driving voltage lower than the common electrode voltage is defined as negative directional driving voltage range 205. The inversion of the liquid crystal molecules is determined by the voltage difference between the positive directional inversion signal voltage and the common electrode voltage when positive directional inversion signal within the positive directional driving voltage range is applied to the source of the TFT; while the inversion of the liquid crystal molecules is determined by the voltage difference between the negative directional inversion signal voltage and the common electrode voltage when negative directional inversion signal within the negative directional driving voltage range is applied to the source of the TFT. In this way, when positive directional driving and negative directional driving, the angles of the liquid crystal rotating toward positive and negative directions are same, making its transmittance to light uniform.

Not only the picture flickering is avoided, but also the liquid crystal is prevented from aging, on the premise that the liquid crystal molecules continuously rotates by setting the common electrode voltage.

Figure 3:
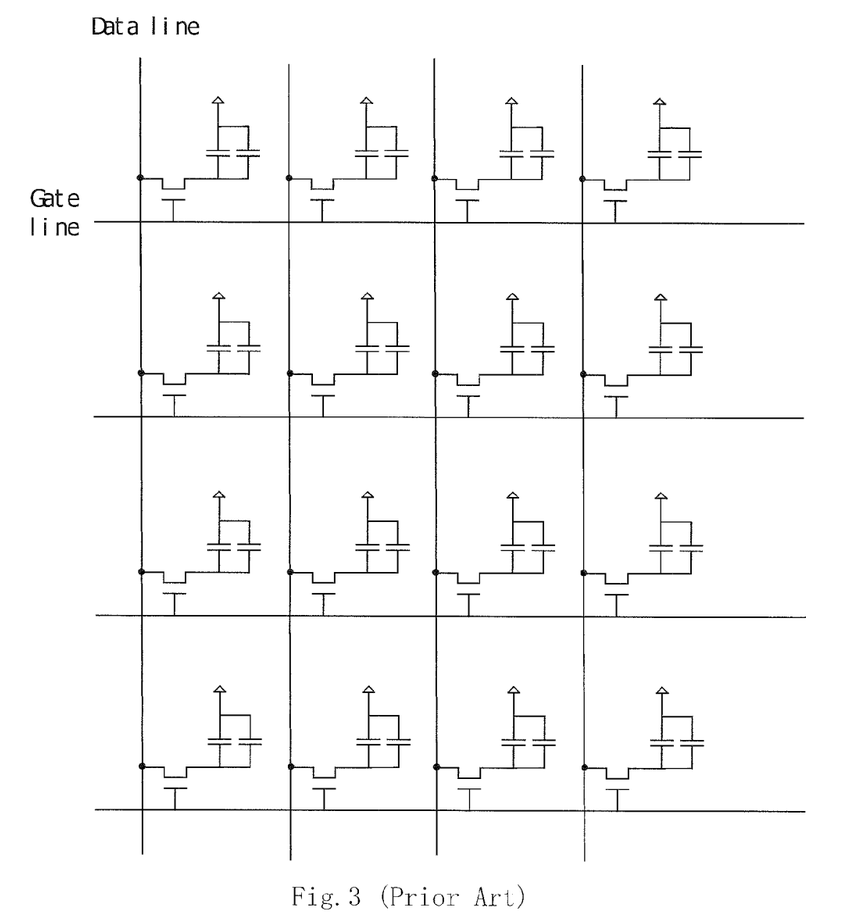
FIG. 3 is a schematic diagram of a TFT array on an array substrate in the prior art.
Figure 4:
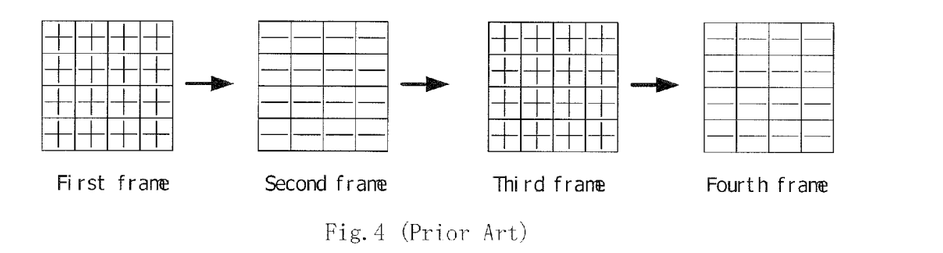
FIG. 4 is a schematic diagram of polarities of voltages between two sides of respective pixel capacitors in TFT array of respective frames when driving liquid crystal to inverse by means of the frame inversion according to the prior art.

A schematic diagram of the TFT array on the array substrate in the prior art is as shown in FIG. 3. Presently, when driving TFT liquid crystal, the inversion manners usually employed are as follows:

(1) Frame Inversion:

That is, the liquid crystal is driven with the voltages of same polarity in one frame of picture, and with reverse polarity of voltage in the next adjacent frame of the picture. A schematic diagram of polarities of voltages between two sides of respective pixel capacitors in TFT array of respective frames when driving liquid crystal to inverse by means of the frame inversion according to the prior art is as shown in FIG. 4.

(2) Row Inversion

Figure 5:
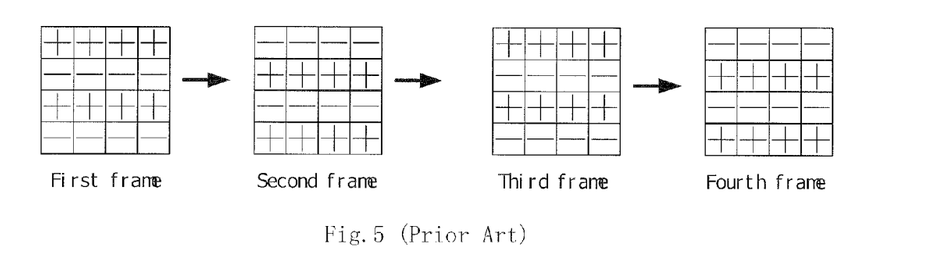
FIG. 5 is a schematic diagram of polarities of voltages between two sides of respective pixel capacitors in TFT array of respective frames when driving liquid crystal to inverse by means of the row inversion according to the prior art.

That is, in one frame of picture, the pixel capacitors on the same row of gate lines are driven with the voltages of same polarity, and the pixel capacitors on the adjacent row of gate lines are driven with the voltages of reverse polarity. A schematic diagram of polarities of voltages between two sides of respective pixel capacitors in TFT array of respective frames when driving liquid crystal to inverse by means of the row inversion according to the prior art is as shown in FIG. 5.

(3) Column Inversion

Figure 6:
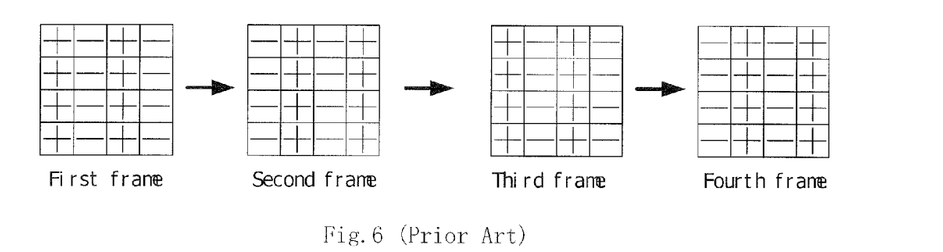
FIG. 6 is a schematic diagram of polarities of voltages between two sides of respective pixel capacitors in TFT array of respective frames when driving liquid crystal to inverse by means of the column inversion according to the prior art.

That is, in one frame of picture, the pixel capacitors on the same column of gate lines are driven with the voltages of same polarity, and the pixel capacitors on the adjacent column of gate lines are driven with the voltages of reverse polarity. A schematic diagram of polarities of voltages between two sides of respective pixel capacitors in TFT array of respective frames when driving liquid crystal to inverse by means of the column inversion according to the prior art is as shown in FIG. 6.

(4) Point Inversion

Figure 7:
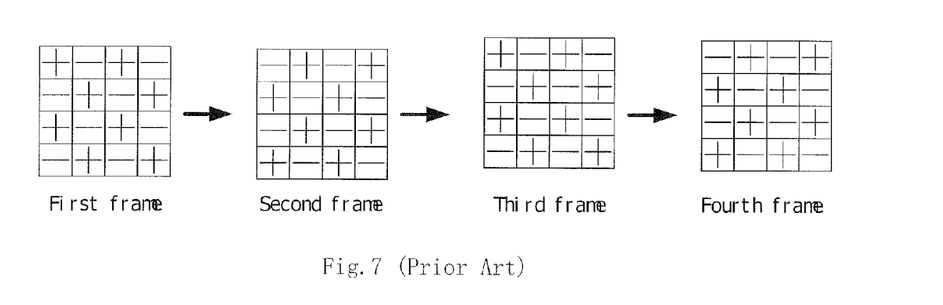
FIG. 7 is a schematic diagram of polarities of voltages between two sides of respective pixel capacitors in TFT array of respective frames when driving liquid crystal to inverse by means of the point inversion according to the prior art.

That is, the polarities of driving voltage of any adjacent pixel capacitors are different in one frame of picture, and each pixel capacitor is driven with reverse polarity of voltage in the next adjacent frame of the picture with respect to the previous adjacent frame of the picture. A schematic diagram of polarities of voltage between two sides of respective pixel capacitors in TFT array of respective frames when driving liquid crystal to inverse by means of the point inversion according to the prior art is as shown in FIG. 7.

There are problems in driving manners for liquid crystal in the prior art, in that: since one common electrode voltage is employed, there is only one reference voltage when positive directional and negative directional driving for liquid crystal, so that dynamic range of driving voltage is large, as shown in FIG. 2, wherein the driving voltage needs to vary within the range as large as described with reference number 202. However, the magnitude of the range of the driving voltage directly determines the power consumption of liquid crystal driving circuit portion, driving manners for liquid crystal in the prior art may thus result in great power consumption in the course of driving.

SUMMARY OF THE INVENTION

An embodiment of the present invention is to provide a liquid crystal display device, which can reduce power consumption in the course of driving the liquid crystal to inverse, with respect to the problems in the prior art.

An embodiment of the present invention provides a thin film transistor-liquid crystal display device, comprising an array substrate and a color filter substrate, a common electrode on said color filter substrate being divided into multiple columns, each of which corresponding to one column of pixels;

on said color filter substrate, odd number columns are first common electrodes, and even number columns are second common electrodes;

the difference between voltages input to said first common electrodes and said second common electrodes is larger than zero and less than a dynamic range of the driving voltage of a liquid crystal driving voltage-transmittance curve.

A driving method for the thin film transistor-liquid crystal display device may comprise:

during the thin film transistor-liquid crystal display device displaying a frame, a first common electrode voltage signal is input to said first common electrodes while second common electrode voltage signal is input to said second common electrodes; and a positive directional driving voltage signal of a first driving voltage-transmittance curve corresponding to said first common electrode voltage is input to odd number columns of data lines on said array substrate of said thin film transistor-liquid crystal display device, while a negative directional driving voltage signal of a second driving voltage-transmittance curve corresponding to said second common electrode voltage is input to even number columns of data lines on said array substrate of said thin film transistor-liquid crystal display device;

during the thin film transistor-liquid crystal display device displaying a next adjacent frame, said second common electrode voltage signal is input to said first common electrodes while said first common electrode voltage signal is input to said second common electrodes; and said negative directional driving voltage signal of said second driving voltage-transmittance curve corresponding to said second common electrode voltage is input to said odd number columns of data lines on said array substrate of said thin film transistor-liquid crystal display device, while said positive directional driving voltage signal of said first driving voltage-transmittance curve corresponding to said first common electrode voltage is input to said even number columns of data lines on said array substrate of said thin film transistor-liquid crystal display device;

the difference between voltages input to said first common electrodes and said second common electrodes is larger than zero and less than the dynamic range of the driving voltage of the liquid crystal driving voltage-transmittance curve.

An embodiment of the present invention also provides a thin film transistor-liquid crystal display device comprising an array substrate and a color filter substrate, a common electrode on said color filter substrate being divided into an array corresponding to pixels;

on said color filter substrate, first common electrodes are set in odd number pixels on odd number rows and even number pixels on even number rows;

second common electrodes are set in even number pixels on odd number rows and odd number pixels on even number rows;

the difference between voltages input to said first common electrodes and said second common electrodes is larger than zero and less than a dynamic range of the driving voltage of a liquid crystal driving voltage-transmittance curve.

A driving method for the thin film transistor-liquid crystal display device comprises:

during the thin film transistor-liquid crystal display device displaying a frame, first common electrode voltage signal is input to said first common electrodes while second common electrode voltage signal is input to said second common electrodes; and a positive directional driving voltage signal of a first driving voltage-transmittance curve corresponding to said first common electrode voltage is input to odd number columns of data lines for the odd number rows and even number columns of data lines for the even number rows on said array substrate of said thin film transistor-liquid crystal display device, while a negative directional driving voltage signal of a second driving voltage-transmittance curve corresponding to said second common electrode voltage is input to even number columns of data lines for the odd number rows and odd number columns of data lines for the even number rows on said array substrate of said thin film transistor-liquid crystal display device;

during the thin film transistor-liquid crystal display device displaying a next adjacent frame, said second common electrode voltage signal is input to said first common electrodes while said first common electrode voltage signal is input to said second common electrodes; and said negative directional driving voltage signal of said second driving voltage-transmittance curve corresponding to said second common electrode voltage is input to the odd number columns of data lines for the odd number rows and the even number columns of data lines for the even number rows on said array substrate of said thin film transistor-liquid crystal display device, while said positive driving voltage signal of said first driving voltage-transmittance curve corresponding to said first common electrode voltage is input to the even number columns of data lines for the odd number rows and the odd number columns of data lines for the even number rows on said array substrate of said thin film transistor-liquid crystal display device;

the difference between voltages input to said first common electrodes and said second common electrodes is larger than zero and less than the dynamic range of the driving voltage of the liquid crystal driving voltage-transmittance curve.

An embodiment of the present invention further provides a driving method for a thin film transistor-liquid crystal display device, comprising:

during the thin film transistor-liquid crystal display device displaying a frame, a first common electrode voltage signal is input to a common electrode on a color filter substrate of said thin film transistor-liquid crystal display device, and a positive directional driving voltage signal of a first driving voltage-transmittance curve corresponding to said first common electrode voltage is input to respective data lines on an array substrate of said thin film transistor-liquid crystal display device;

during the thin film transistor-liquid crystal display device displaying a next adjacent frame, second common electrode voltage signal is input to said common electrode on said color filter substrate of said thin film transistor-liquid crystal display device, and a negative directional driving voltage signal of a second driving voltage-transmittance curve corresponding to said second common electrode voltage is input to said respective data lines on said array substrate of said thin film transistor-liquid crystal display device;

the difference between voltages input to said first common electrodes and said second common electrodes is larger than zero and less than the dynamic range of the driving voltage of the liquid crystal driving voltage-transmittance curve.

The thin film transistor-liquid crystal display device and its driving method provided by the embodiments of the present invention set a first common electrode voltage and second common electrode voltage, and set the difference between the first and the second common electrode voltages to be larger than zero and less than dynamic range of the driving voltage of liquid crystal driving voltage-transmittance curve, thus it may be assured that the dynamic range of input voltage required for driving the liquid crystal display device is smaller than the dynamic range of the driving voltage of the liquid crystal driving voltage-transmittance curve, reducing the power consumption when driving the liquid crystal to inverse.

In the following, by way of accompanying drawings and embodiments, further detailed description will be made to the technical schemes of the embodiments of the present invention.

DESCRIPTION OF THE EMBODIMENTS

Liquid crystal display device uses lattice mode to display image of certain resolution. In the liquid crystal display device, one TFT, a pixel electrode and a common electrode set on a color filter substrate may constitute one display unit, which may be referred to as one pixel.

Figure 8:
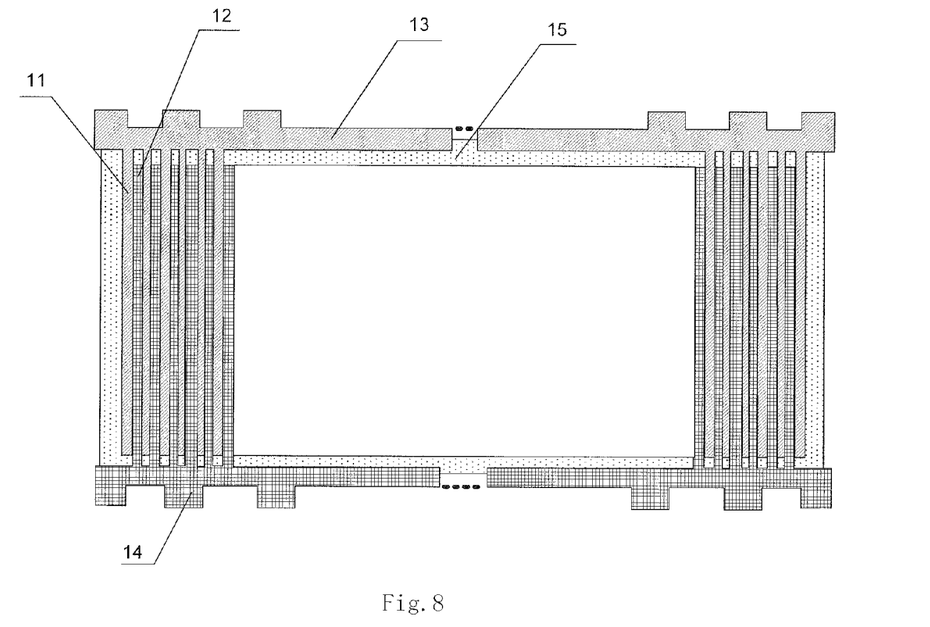
FIG. 8 is a structural schematic diagram of a color filter substrate in a first embodiment of TFT liquid crystal display device according to an embodiment of the present invention.

A structural schematic diagram of a color filter substrate in a first embodiment of TFT liquid crystal display device according to an embodiment of the present invention. Within the color filter substrate, the common electrode is divided into multiple columns, each corresponding to one column of pixels, the common electrode 11 of odd number columns being connected to a first transfer electrode point 13, the common electrode 12 of even number columns being connected to a second transfer electrode point 14. A Black Matrix (BM) 15 is also included in FIG. 8.

Figure 9:
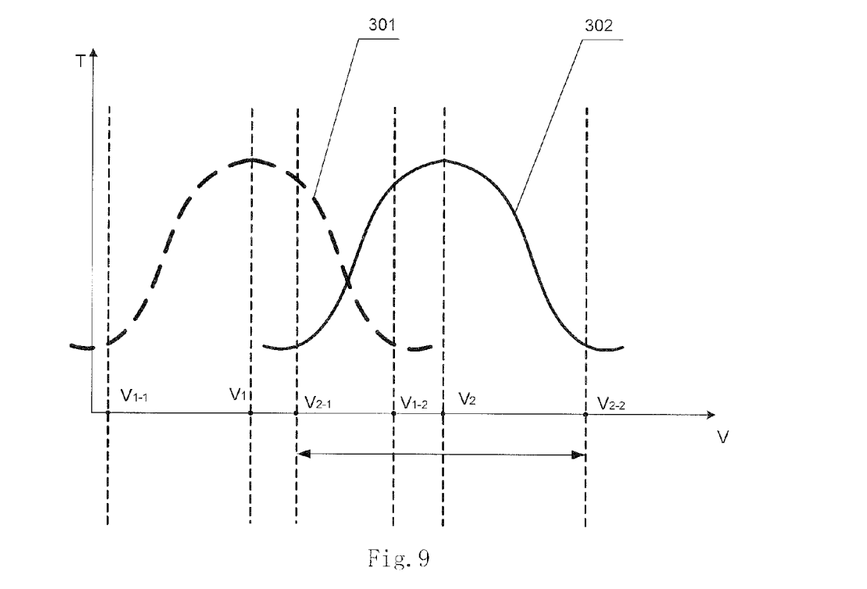
FIG. 9 is a schematic diagram of a first embodiment of driving method for TFT liquid crystal display device according to an embodiment of the present invention.

A schematic diagram of a first embodiment of driving method of TFT liquid crystal display device according to an embodiment of the present invention is as shown in FIG. 9. In the following the driving manner of the first embodiment of liquid crystal display device according to an embodiment of the present invention will be explained in detail in combination with FIG. 8 and FIG. 9.

As shown in FIG. 9, firstly, two common electrode voltages, i.e., a first common electrode voltage $V_1$ and a second common electrode voltage $V_2$ are set, and a first common electrode voltage signal is input to the first transfer electrode point while second common electrode voltage signal is input to the second transfer electrode point. $V_1$ is the corresponding abscissa at maximum transmittance of a first V-T curve 301, and $V_2$ is the corresponding abscissa at maximum transmittance of a second V-T curve 302. Since V-T curve for liquid crystal is determined by property of liquid crystal, and for a liquid crystal display device, the shape of the V-T curve for its liquid crystal is certain, and common electrode voltage is the abscissa corresponding to the point of maximum transmittance of V-T curve, the shapes of corresponding V-T curves for different common electrode voltages are identical, with the position of the curves shifting in the direction of lateral axis.

Wherein the difference between $V_1$ and $V_2$ should be larger than zero and less than dynamic range of the driving voltage of the first V-T curve, the beginning point and end point of which are respectively $V_{1-1}$ and $V_{1-2}$, and the beginning point and end point of dynamic range of the driving voltage of the second V-T curve are respectively $V_{2-1}$ and $V_{2-2}$. Generally, because parasitic capacitance exists among gate, source and drains of TFT, the ranges of positive directional and negative directional driving voltage in V-T curve are not completely identical.

During the liquid crystal display device displaying a frame, on the color filter substrate, the first common electrode voltage signal is input to the first common electrodes for the odd number columns of pixels; on the array substrate, the positive directional driving voltage signal of the first V-T curve, i.e. the voltage signals within the range from $V_1$ to $V_{1-2}$ of the first V-T curve as shown in FIG. 9, is input to the odd number columns of data lines. Since all of the signal voltages within the range from $V_1$ to $V_{1-2}$ are equal to or larger than signal voltage of $V_1$, positive directional voltage is applied between two sides of the liquid crystal, thus the voltage signals within the range from $V_1$ to $V_{1-2}$ may be referred to as positive directional driving voltage signal. Meanwhile, the second common electrode voltage signal is input to the second common electrodes for the even number columns of pixels; on the array substrate, the reverse driving voltage signal of the second V-T curve, i.e. the voltage signals within the range from $V_{2-1}$ to $V_2$ of the second V-T curve as shown in FIG. 9, is input to the even number columns of data lines. Since all of the signal voltages within the range from $V_{2-1}$ to $V_2$ are equal to or less than signal voltage of $V_2$, negative voltage is applied between two sides of the liquid crystal, thus the voltage signals within the range from $V_{2-1}$ to $V_2$ may be referred to as negative directional driving voltage signal.

During the liquid crystal display device displaying a next adjacent frame, on the color filter substrate, the second common electrode voltage signal is input to the first common electrodes for the odd number columns of pixels, while on the array substrate, negative directional driving voltage signal of the second V-T curve is input to the odd number columns of data lines. Meanwhile, the first common electrode voltage signal is input to the second common electrodes for the even number columns of pixels, while on the array substrate, the positive directional driving voltage signal of the first V-T curve is input to the even number columns of data lines.

The column inversion as shown in FIG. 6 can be achieved by employing the above driving manner. In the above driving manner, the varying range for the driving voltages input to the first or second common electrodes is from $V_1$ to $V_2$. Because the difference between $V_1$ and $V_2$ is less than dynamic range of the driving voltage of the first V-T curve, it can be assured that the dynamic range for the driving voltage signals input to the first and second common electrodes is smaller than dynamic range of the driving voltage of the first V-T curve, thus reducing power consumption in the course of driving the liquid crystal display device.

Figure 10:
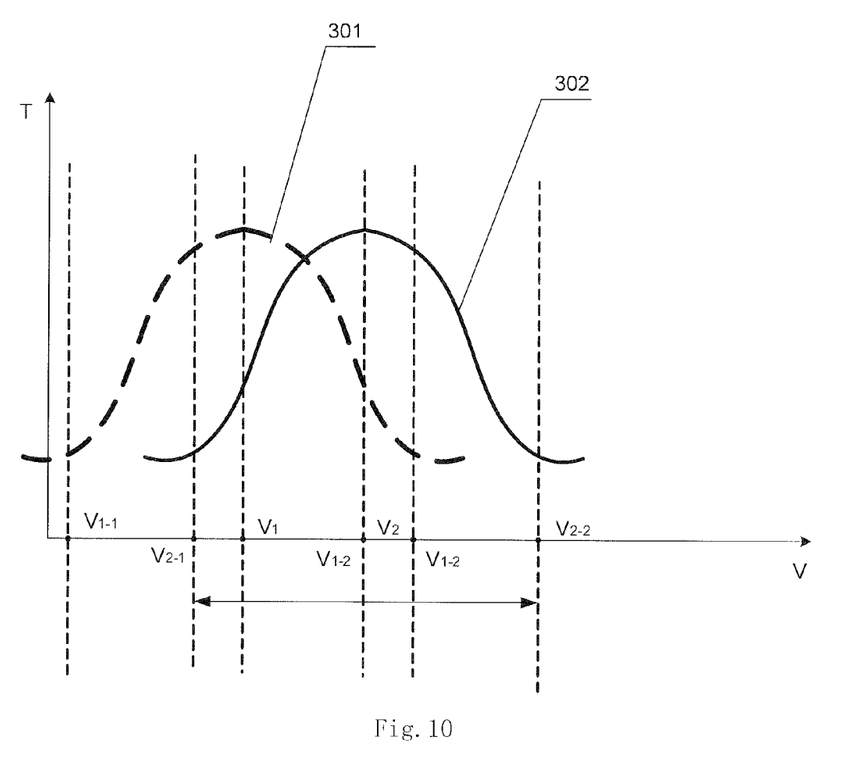
FIG. 10 is a schematic diagram of a second embodiment of driving method for TFT liquid crystal display device according to an embodiment of the present invention.

In FIG. 9, the difference between $V_1$ and $V_2$ is less than the dynamic range of the driving voltage of the first V-T curve, and $V_{1-2}$ is less than $V_2$, and $V_{2-1}$ is larger than $V_1$. Setting for $V_1$ and $V_2$ may be as shown in FIG. 10, which is a schematic diagram of a second embodiment of driving method for TFT liquid crystal display device according to an embodiment of the present invention. In FIG. 10, $V_{1-2}$ is larger than $V_2$, and $V_{2-1}$ is less than $V_1$ with assuring that the difference between $V_1$ and $V_2$ is larger than zero and less than the dynamic range of the driving voltage of the first V-T curve. In such case, the dynamic range for the driving voltage signals input to the first and second common electrodes is smaller than dynamic range of the driving voltage of the first V-T curve as well. In an implementation, the dynamic range for the driving voltage signals input to the first and second common electrodes can be made close to the larger one of positive directional or negative directional dynamic range of the driving voltages of the first V-T curve, thus better reducing the power consumption in the course of driving the liquid crystal display device.

Figure 11:
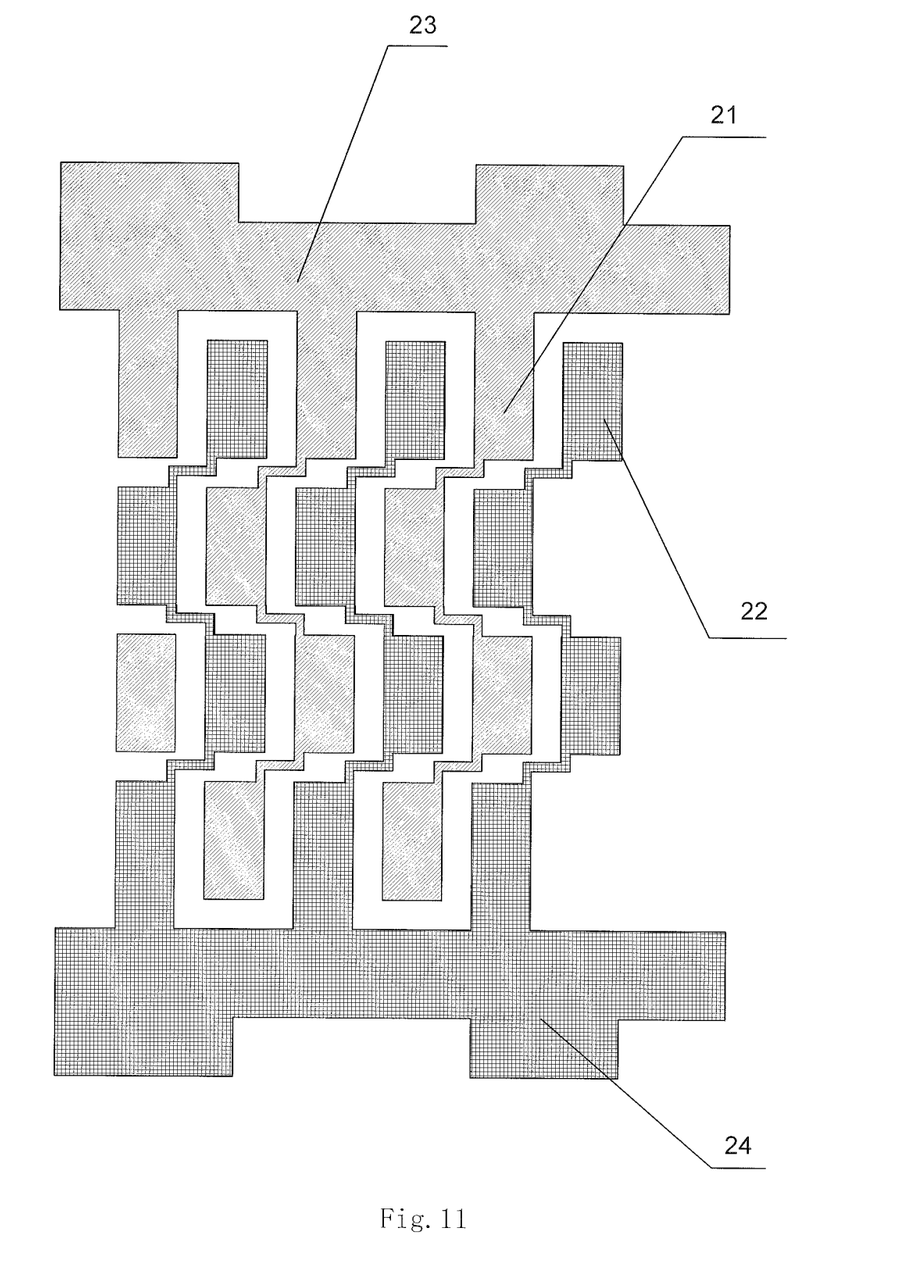
FIG. 11 is a structural schematic diagram of a color filter substrate in a second embodiment of TFT liquid crystal display device according to an embodiment of the present invention.

A structural schematic diagram of a color filter substrate in a second embodiment of TFT liquid crystal display device according to an embodiment of the present invention is as shown in FIG. 11. On the color filter substrate, the common electrode is divided into the array corresponding to the pixels, and the first common electrodes 21 is set in the odd number pixels on the odd number rows and the even number pixels on the even number rows while the second common electrodes 22 is set in the even number pixels on the odd number rows and the odd number pixels on the even number row. The common electrode on the color filter substrate is obtained by way of deposition so that in order to implement the structure of the color filter substrate in the second embodiment, it is possible to connect the common electrodes for odd number pixels on the odd number rows and the even number pixels on the even number rows, further connect to the first transfer electrode point 23 and input the first common electrode voltage; and to connect the common electrodes for even number pixels on the odd number rows and the odd number pixels on the even number rows, further connect to the second transfer electrode point 24 and input the second common electrode voltage.

During the liquid crystal display device displaying a frame, the first common electrode voltage signal is input to the first transfer electrode point, i.e., to all of the first common electrodes, while the second common electrode voltage signal is input to the second transfer electrode point, i.e. to all of the second common electrodes. Also, the positive directional driving voltage signal of the first V-T curve corresponding to the first common electrode voltage is input to the odd number columns of data lines for the odd number rows and the even number columns of data lines for the even number rows on the array substrate of the liquid crystal display device, while the negative directional driving voltage signal of the second V-T curve corresponding to the second common electrode voltage is input to the even number columns of data lines for the odd number rows and the odd number columns of data lines for the even number rows on the array substrate of the liquid crystal display device.

During the liquid crystal display device displaying the next adjacent frame, the second common electrode voltage signal is input to the first transfer electrode point, i.e., to all of the first common electrodes, while the first common electrode voltage signal is input to the second transfer electrode point, i.e., to all of the second common electrodes. Also, the negative directional driving voltage signal of the second V-T curve corresponding to the second common electrode voltage is input to the odd number columns of data lines for the odd number rows and the even number columns of data lines for the even number rows on the array substrate of the liquid crystal display device, while the positive directional driving voltage signal of the first V-T curve corresponding to the first common electrode voltage is input to the even number columns of data lines for the odd number rows and the odd number columns of data lines for the even number rows on the array substrate of the liquid crystal display device.

With the structure of the color filter substrate as shown in FIG. 11, the point inversion as shown in FIG. 7 can be achieved. Setting the difference between the first and the second common electrode voltages to be larger than zero and less than the dynamic range of the driving voltage of the first V-T curve can assure that the dynamic range of input voltage required for driving the liquid crystal display device consisting of the color filter substrate as shown in FIG. 11 is smaller than the dynamic range of the driving voltage of the first V-T curve, thus reducing the power consumption when driving the liquid crystal display device.

In the prior art, a common electrode is usually a layer of ITO (Indium-tin oxide) deposited on a color filter substrate, that is to say, the common electrodes are integration as a whole. With respect to the liquid crystal display device of such structure, the way of performing driving by setting two common electrodes can be that:

During the liquid crystal display device displaying a frame, the first common electrode voltage signal is input to the common electrode on the color filter substrate, and the positive directional driving voltage signal of the first V-T curve corresponding to the first common electrodes is input to respective data lines on the array substrate;

During the liquid crystal display device displaying the next adjacent frame, the second common electrode voltage signal is input to the common electrode on the color filter substrate, and the negative directional driving voltage signal of the second V-T curve corresponding to the second common electrodes is input to respective data lines on the array substrate.

The frame inversion can be achieved by means of such driving manner. Setting the difference between the first and the second common electrode voltages to be larger than zero and less than the dynamic range of the driving voltage of the first V-T curve can assure that the dynamic range of input voltage required for driving the liquid crystal display device in the prior art is smaller than the dynamic range of the driving voltage of the first V-T curve, thus reducing the power consumption when driving the liquid crystal display device.

Finally, it should be noted that the above embodiments is only for explaining the technical solutions of the embodiments of the present invention, and not for limiting. Although the embodiments of the present invention have been described in details with reference to the embodiments, those skilled in the art should be appreciated that the technical solutions of the present invention still can be modified or equivalently replaced; and these modifications or equivalent replacements will not make the modified technical solution departing from the spirit and scope of the technical solution of the present invention.

What is claimed is:

1. A thin film transistor-liquid crystal display device comprising an array substrate and a color filter substrate, wherein a common electrode on said color filter substrate are divided into multiple columns, each of which corresponding to one column of pixels;

on said color filter substrate, odd number columns are first common electrodes, and even number columns are second common electrodes;

wherein, the thin film transistor-liquid crystal display device is configured to, when inputting the first common electrodes a first driving voltage corresponding to a maximum liquid crystal transmittance of a first liquid crystal driving voltage-transmittance curve, input a second driving voltage corresponding to a maximum liquid crystal transmittance of a second liquid crystal driving voltage-transmittance curve to the second common electrodes;

wherein the first liquid crystal driving voltage-transmittance curve is symmetric with the first driving voltage, and the second liquid crystal driving voltage-transmittance curve is symmetric with the second driving voltage;

the first liquid crystal driving voltage-transmittance curve intersects with the second liquid crystal driving voltage-transmittance curve at a point, and a driving voltage corresponding to the point is larger than the first driving voltage and less than the second driving voltage;

wherein polarities of odd-numbered columns of data lines on the array substrate relative to the first common electrodes are opposite to those of even-numbered columns of data lines on the array substrate relative to the second common electrodes.

2. A driving method for the thin film transistor-liquid crystal display device according to claim 1, wherein the driving method comprises:

during the thin film transistor-liquid crystal display device displaying a frame, a first common electrode voltage signal is input to said first common electrodes while second common electrode voltage signal is input to said second common electrodes; and a positive directional driving voltage signal of a first liquid crystal driving voltage-transmittance curve corresponding to said first common electrode voltage is input to odd number columns of data lines on said array substrate of said thin film transistor-liquid crystal display device, while a negative directional driving voltage signal of a second liquid crystal driving voltage-transmittance curve corresponding to said second common electrode voltage is input to even number columns of data lines on said array substrate of said thin film transistor-liquid crystal display device;

during the thin film transistor-liquid crystal display device displaying a next adjacent frame, said second common electrode voltage signal is input to said first common electrodes while said first common electrode voltage signal is input to said second common electrodes; and said negative directional driving voltage signal of said second liquid crystal driving voltage-transmittance curve corresponding to said second common electrode voltage is input to said odd number columns of data lines on said array substrate of said thin film transistor-liquid crystal display device, while said positive directional driving voltage signal of said first liquid crystal driving voltage-transmittance curve corresponding to said first common electrode voltage is input to said even number columns of data lines on said array substrate of said thin film transistor-liquid crystal display device.

3. A driving method for a thin film transistor-liquid crystal display device, wherein the driving method comprises:

during the thin film transistor-liquid crystal display device displaying a frame, a first common electrode voltage signal is input to a common electrode on a color filter substrate of said thin film transistor-liquid crystal display device, and a positive directional driving voltage signal of a first liquid crystal driving voltage-transmittance curve corresponding to said first common electrode voltage is input to respective data lines on an array substrate of said thin film transistor-liquid crystal display device;

during the thin film transistor-liquid crystal display device displaying a next adjacent frame, second common electrode voltage signal is input to said common electrode on said color filter substrate of said thin film transistor-liquid crystal display device, and a negative directional driving voltage signal of a second liquid crystal driving voltage-transmittance curve corresponding to said second common electrode voltage is input to said respective data lines on said array substrate of said thin film transistor-liquid crystal display device;

wherein, when the first common electrode voltage signal is a first driving voltage corresponding to a maximum liquid crystal transmittance of the first liquid crystal driving voltage-transmittance curve, the second common electrode voltage signal is a second driving voltage corresponding to a maximum liquid crystal transmittance of the second liquid crystal driving voltage-transmittance curve;

wherein the first liquid crystal driving voltage-transmittance curve is symmetric with the first driving voltage, and the second liquid crystal driving voltage-transmittance curve is symmetric with the second driving voltage;

the first liquid crystal driving voltage-transmittance curve intersects with the second liquid crystal driving voltage-transmittance curve at a point, and a driving voltage corresponding to the point is larger than the first driving voltage and less than the second driving voltage.

* * * * *